Patented Nov. 25, 1941

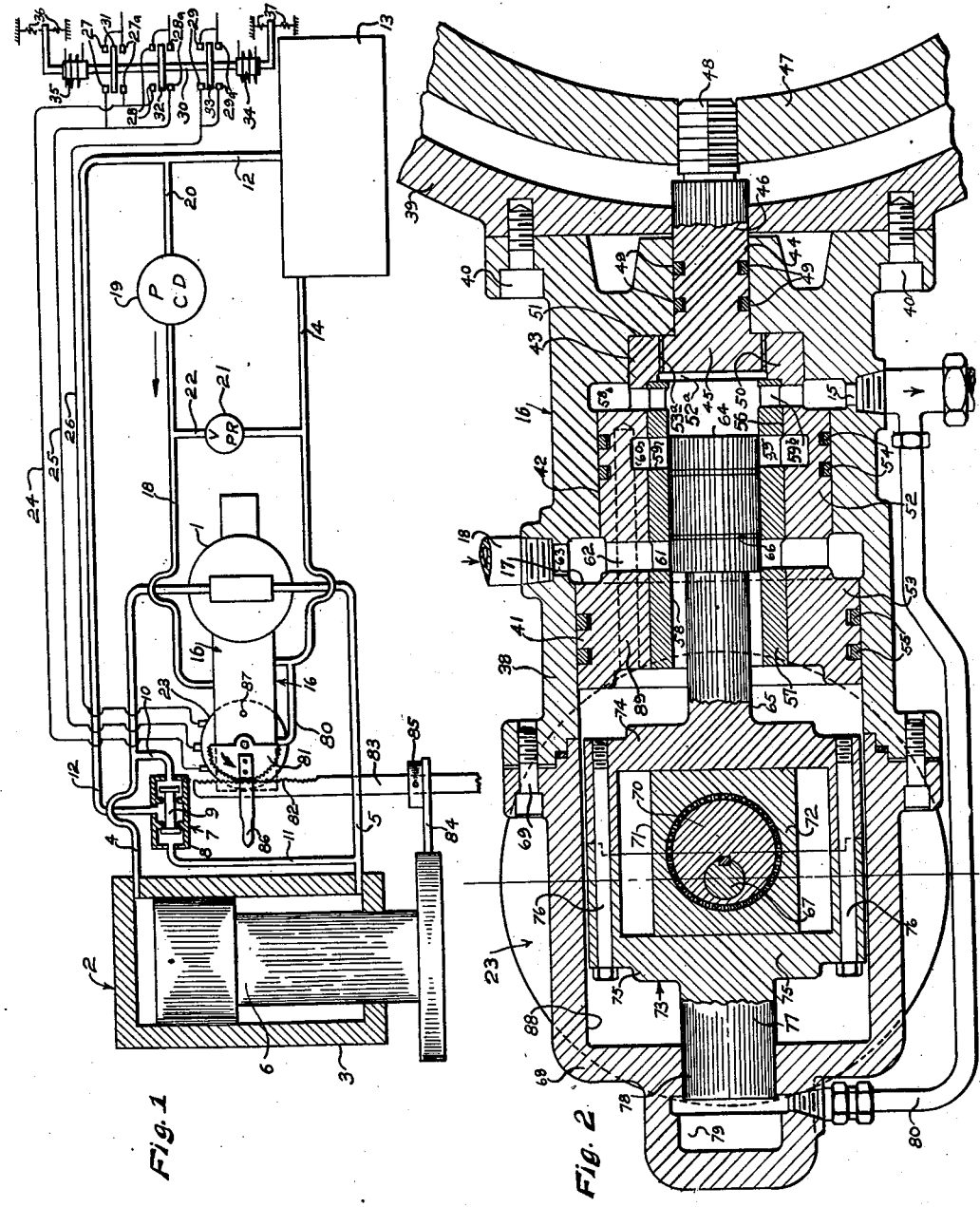

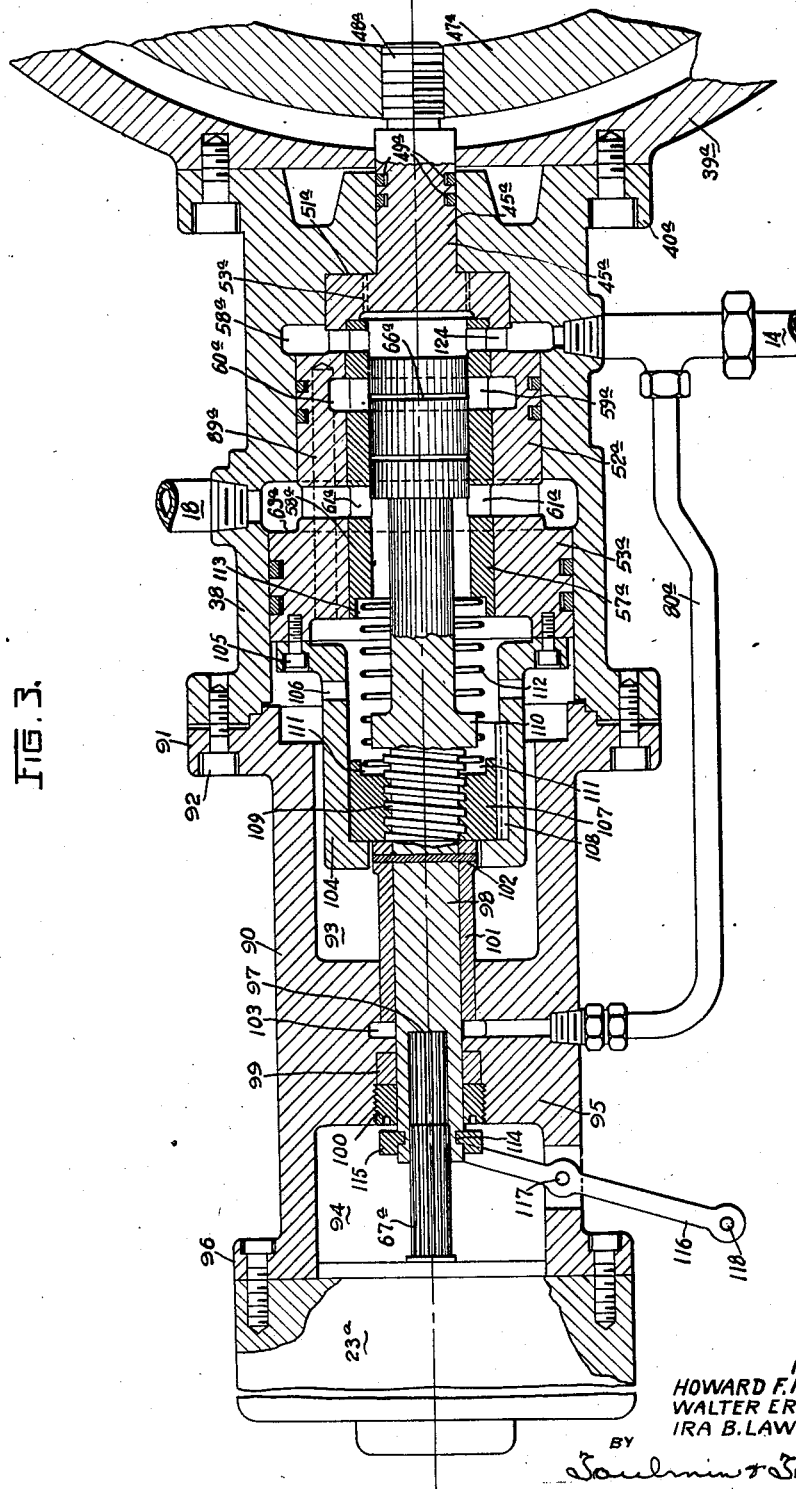

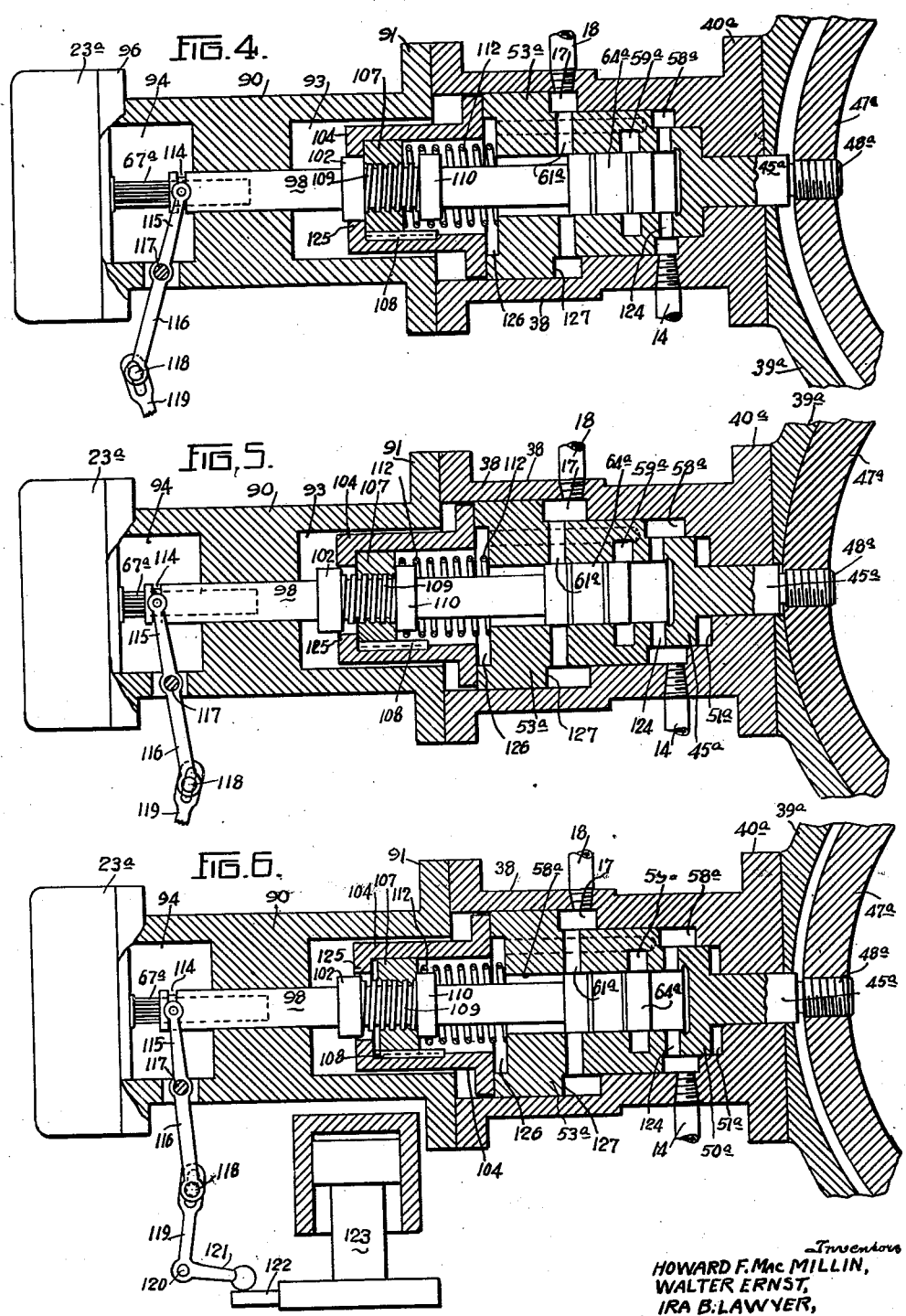

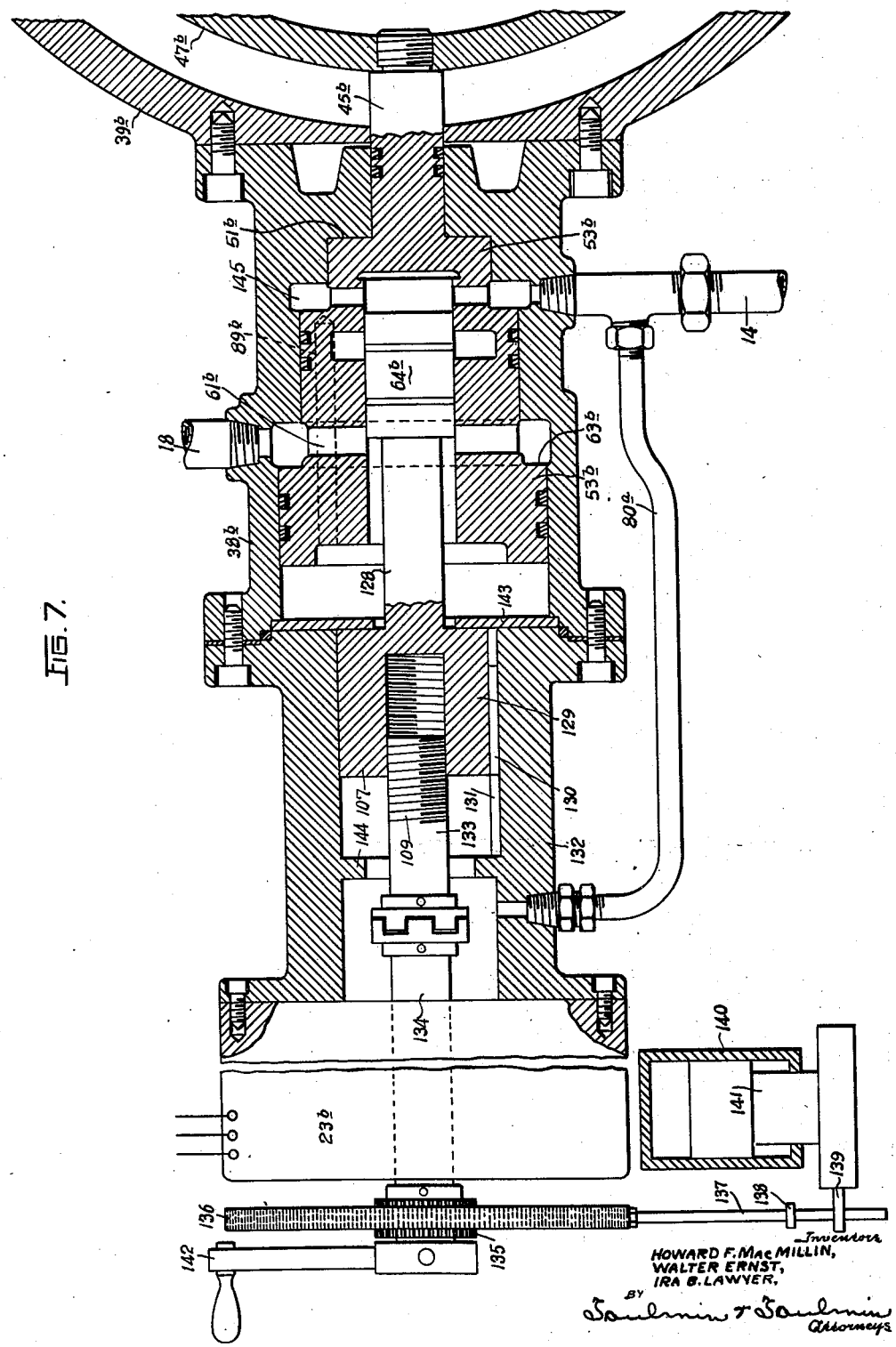

2,263,812

UNITED STATES PATENT OFFICE 2,263,812

MOTOR DRIVEN SERVOMOTOR WITH RECIPROCATING PILOT VALVE

Howard F. MacMillin, Ira B. Lawyer, and Walter Ernst, Mount Gilead, Ohio, assignors to The Hydraulic Development Corp., Inc., Wilmington, Del., a corporation of Delaware Application June 12, 1940, Serial No. 340,128

27 Claims. (Cl. 103—38)

The present invention relates to hydraulic controlling devices, and more particularly to servomotors for controlling variable delivery pumps.

Heretofore servomotors for controlling variable delivery pumps have been actuated by electrically controlled solenoids the armature of which is connected by means of a linkage with the pilot piston of the servomotors. While such arrangements work quite satisfactorily with certain kind of presses, they cause a sudden jerk which unduly affects the operation of high tonnage presses.

Consequently it is an object of the present invention to provide a quiet, smooth acting servomotor which may be operated with a minimum of effort for controlling a variable delivery pump.

It is another object of the invention to provide a servomotor having a servomotor pilot piston for controlling a variable delivery pump, in which the spring, heretofore required for moving the servomotor pilot piston in one direction, may be eliminated so that less force will be required to actuate the servomotor.

A further object of the invention consists in the provision of a servomotor as set forth in the preceding paragraphs, in which the servomotor pilot piston is rotated during its movement from one position to another position.

It is a still further object of the invention to provide a servomotor having a servomotor pilot piston for controlling a variable delivery pump, in which the servomotor pilot piston is operated by a reversible torque motor.

Still another object of the invention is to provide a servomotor of the above character which will reduce the weight of the linkage required for initiating the operation of the servomotor, and will make the servomotor readily controllable by hand while reducing noise and shock incident to its operation.

These and other objects and advantages of the invention will appear more clearly from the following specification in connection with the accompanying drawings, in which:

Figure 1 diagrammatically illustrates a press, together with a hydraulic circuit therefor, in connection with a variable delivery pump controlled by a servomotor according to the present invention.

Figure 2 illustrates, on a somewhat larger scale than Figure 1, an embodiment of the servomotor of the present invention.

Figure 3 is a second embodiment of the servomotor according to the present invention.

Figures 4, 5 and 6 illustrate different stages of the operation of the embodiment illustrated in Figure 3.

Figure 7 is a somewhat modified construction of the device shown in Figure 3.

*General arrangement*

In general, the servomotor, according to the present invention, comprises a control rod adapted when subjected to fluid pressure to operate the shift member of the variable delivery pump, while the supply of fluid to said control rod is controlled by a reciprocable valve member which is operable by means of a reversible torque motor.

According to one embodiment of the invention the shaft of the torque motor is arranged rectangularly with respect to the reciprocable valve member and is keyed to an eccentric journalled in a block which slides in a scotch crosshead operatively connected with said reciprocable valve member.

Rotation of the motor shaft by a predetermined angle actuates the eccentric so as to move the valve member in one or the other direction, thereby causing pressure fluid from a pilot pump to shift the control rod in the desired direction by a predetermined distance for varying the delivery of fluid of the variable delivery pump.

According to another embodiment, a shaft of the torque motor is arranged in alignment with the reciprocable valve member, and has a threaded extension engaging a correspondingly threaded nut connected with the valve member. The nut is prevented from rotation by any convenient means but is allowed to move axially. The arrangement is such that the rotation of the motor shaft causes an axial movement of the nut and the valve member, thereby allowing pressure fluid supplied by a pilot pump to shift the control rod for varying the delivery of fluid of the variable delivery pump. The direction of rotation of the motor shaft will determine the direction of axial movement of the valve member.

*Structural arrangement*

Referring now to the drawings in detail, Figure 1 shows a hydraulic press circuit containing a variable delivery pump 1 arranged to drive a press, generally designated 2, and connected with the upper and lower portion of the press cylinder 3 by means of conduits 4 and 5 respectively, to move the press plunger 6 downwardly or upwardly. A shuttle valve, generally designated 7, comprising a valve casing 8 and valve member 9, is connected by means of a conduit 10 with the conduit 4 and by means of a conduit 11 with the conduit 5. The shuttle valve 7 is furthermore connected by means of a conduit 12 with a surge tank 13. The shuttle valve 7 is adapted, in a manner well known to those skilled in the art, selectively to connect the conduit 4 or the conduit 5 with the fluid tank 13 so as to establish communication between the surge tank 13 and the respective side of the variable delivery pump 1 and to enable the surplus of fluid expelled by the press plunger 6 during its retraction stroke to exhaust into the surge tank 13.

The surge tank is connected by means of the conduit 14 with the port 15 (see Figure 2) of the servomotor, generally designated 16, while the port 17 of the servomotor 16 communicates by means of a conduit 18 with the pressure side of the pilot pump 19 having its suction side in communication with the conduit 12 by means of a conduit 20. A relief valve 21 is arranged in a conduit 22 so as to be able to establish communication between the conduits 18 and 14, which latter leads to the fluid tank 13.

A reversible torque motor 23 is associated with the servomotor 16 and is electrically connected by means of the lines 24, 25 and 26 with contacts 27, 27a, 28, 28a, 29 and 29a; the said contacts are adapted to be connected with main supply lines by any convenient switch means. Cooperating with the said contacts is an armature 30 having switch blades 31, 32 and 33 and being adapted to be shifted downwardly by energization of the solenoid 34 so as to respectively bridge the contacts 27a, 28a and 29a, or to be shifted upwardly by energization of the solenoid 35 so as to respectively bridge the contacts 27, 28 and 29. Depending on whether the upper contacts or lower contacts are closed the torque motor 23 will be moved in one direction or the other direction, thereby causing the variable delivery pump to supply fluid to the press cylinder 3 for moving the latter in one direction or the other direction. When neither solenoid 34 nor solenoid 35 is energized the springs 36 and 37 will hold the armature 30 in its intermediate position shown in Figure 1.

According to the embodiment of Figure 2 the servomotor 16 comprises a hollow arm 38, flanged to the casing 39 of the variable delivery pump by means of screws 40. The servomotor arm 38 comprises four bores of different diameter, namely, bores 41, 42, 43 and 44, having slidably mounted therein correspondingly shaped interconnected rod portions of a control member or control rod, generally designated 45. The control member or rod 45 comprises a rod portion 46 passing through the bore 44 of the hollow arm 38 and connected with the shift member 47 by means of the threaded portion 48, or in any other convenient manner.

The shift member 47 is operatively connected with a secondary rotor (not shown) of the variable delivery pump, in a manner well known to those skilled in the art, and is adapted to be shifted into eccentricity with respect to a primary rotor (likewise not shown) for causing the variable delivery pump to deliver pressure fluid in one direction or the other. A variable delivery pump of the character referred to is described, for instance, in the Ernst Patent No. 2,021,353.

Integral with the rod portion 46, in the periphery of which are mounted piston rings 49, is the rod portion 50 adapted to abut the surface 51 of the hollow arm 38 so as to stop the rightward movement of the control rod 45. The rod portion 50 comprises a recess 52a, communicating with transverse bores 53a, for preventing fluid from being trapped between the rod portion 50 and the surface 51 of the hollow arm 38. Connected with the rod portion 50 are the rod portions 52 and 53, provided with piston rings 54 and 55 respectively, and also provided with a bore 56. In the bore 56 and connected with the rod portions 52 and 53 is a bushing 57 having an accurate cylindrical bore 58. The bushing 57 has ports 59 opening into an annular channel 60 in the rod portion 52 and communicating with longitudinal bores 89. The bushing 57 also has ports 61 communicating through openings 62, arranged between the rod portions 52 and 53, with an annular recess 63. The bushing 57 furthermore, comprises ports 59b communicating through a recess 58b in the hollow arm 38 with the port 15. The annular channel 60 may thus, through the bushing 57, communicate with the port 15 connected with the conduit 14 which leads to the surge tank 13. The annular recess 63 communicates with the port 17 and the conduit 18 leading to the pilot pump 19.

Carefully fitted within the bushing 57 and reciprocably mounted therein is a piston 64 forming a part of the servomotor piston rod, generally designated 65. As will be seen from the drawings, the length of the piston 64 corresponds substantially to the distance between the two remote sides of the ports 59 and 61 in the bushing 57. The piston 64 is provided with two grooves 66 for equalizing the pressure on all sides thereof.

Flanged to one side of the servomotor with its shaft 67 at a right angle to the center line of the servomotor piston 64 is the torque motor 23. This motor is preferably of a high torque, low amperage, reversing type, suitable for 100% stalled service. The motor shaft 67 extends from the torque motor through stuffing boxes (not shown) on both sides of the servomotor head 68 which latter is connected to the hollow arm 38 by means of screws 69. The servomotor head 68 comprises a chamber 88 adapted to be supplied with fluid through the port 17, the opening 62, the port 61 and the bore 58 of the bushing 57. The chamber 88 also communicates through bores 89 in the push rod portions 53 and 52 with the annular recess 60 in the push rod portion 52. The shaft 67 is keyed to an eccentric 70 which is surrounded by needle bearings 71 mounted in a block 72. The block 72 is slidably mounted in a scotch crosshead, generally designated 73 and composed of two portions 74 and 75 connected by means of connecting bolts 76. The scotch crosshead 73 which is movable within the servomotor head 68 is connected on one side thereof with the valve rod 65 and on the other side with the guide rod 77.

The diameter of the guide rod 77 is about the same as the diameter of the valve rod piston 66 so as to provide a hydraulically balanced condition. The guide rod 77 is slidably mounted in a carefully fitted bore 78 of the servomotor head 68. The bore 78 opens into a cup-shaped chamber 79 adapted to convey fluid leaking by the guide rod 77 into the conduit 80 leading to the exhaust conduit 14. If desired, but not necessarily, there may be used, on the opposite side of the pump, a spring centering device, as disclosed by Ernst's patent application No. 170,250, filed October 21, 1937.

Rotatably connected with the motor shaft 67 is a gear segment 81 meshing with a rack 82 carried by a reciprocable push rod 83. The push rod 83 passes slidably through a corresponding bore in the platen arm 84 supported by the press plunger 6. Adjustably connected with the push rod 83 is a collar 85 which is so mounted on the push rod 83 that it is engaged by the arm 84 when the press plunger 6 approaches the end of its retraction stroke. In this way the push rod 83 is lifted during the last part of the retraction stroke of the press plunger 6, thereby causing the rack 82 to rotate the gear segment 81 to such an extent that the motor shaft 67 will move the shift member 47 by means of the eccentric 70 and valve rod 65 to neutral position.

In order to enable manual rotation of the motor shaft 67, for instance, if the supply of electric current to the torque motor is interrupted, the gear segment 81 is provided with a manually operable lever 86. The rotative movement of the gear segment 81 is limited by a stop 87 so that the gear segment 81 can rotate 180° only.

*Operation*

In the position shown in Figure 2 the control rod 45 is in its extreme right-hand position so that the pump is on full stroke, say for instance forward stroke. It is assumed that, in this position, relay coil 34 is energized so that the lower contacts 27a, 28a and 29a are closed. If it is now desired to reverse the pump for retracting the press plunger 6, solenoid 34 is deenergized and solenoid 35 is energized so that the upper contacts 27, 28 and 29 are closed. The torque motor 23 will then be energized so as to rotate its shaft 67 in anti-clockwise direction with regard to Figure 2, by 180°.

The rotative movement of the shaft 67 together with the eccentric 70 causes the valve rod piston 66 to move to its extreme left position where it comes to a halt due to the engagement of the gear segment 81 with the stop 87. In this extreme left position of the valve rod piston 64, the ports 59 are uncovered so that fluid contained in the chamber 88 of the servomotor head 68 is permitted to exhaust through the bores 89, the annular recess 60 the ports 59, the bore 58 and the port 15, into the conduit 14 leading to the fluid tank 13. Consequently, pressure fluid entering through the conduit 18 and supplied by the pilot pump 19 acts on the annular recess 63 of the rod portion 53, thereby moving the valve rod 45 toward the left until the ports 59 are again covered by the piston 64, or until shift ring 47 abuts the left side of casing 39.

The movement of the valve rod 45 into its extreme left position has placed the variable delivery pump on its full retraction stroke so that the press plunger 6 now moves upwardly. Shortly before the press plunger 6 approaches the end of its retraction stroke, the platen arm 84 engages the collar 85 on the rod 83 and while the press plunger 6 moves further upwardly the rod 83 is lifted. The lifting movement of the rod 83 causes the rack 82 to rotate the gear segment 81 to such an extent that, at the end of the retraction stroke of the press plunger 6, the gear segment 81 occupies the position shown in Figure 1, in which position the center of the eccentric 70 lies on the vertical axis passing through the center of the motor shaft 67 so that the variable delivery pump is in its neutral position. At the end of the retraction stroke, blades 31, 32 and 33 of the armature 30 may be returned by any convenient means to their intermediate position between the adjacent contacts.

When again a press stroke of the press plunger 6 is to be effected, the solenoid 34 is to be energized, thereby bridging the contacts 27a, 28a, 29a, and rotating the motor shaft 67 in clockwise direction into the position shown in Figure 2. This rotative movement of the motor shaft 67 causes, in connection with the eccentric 70, a rightward movement of the valve rod piston 65 into the position shown in Figure 2. At that time the port 61 is uncovered by the piston 65, whereas the port 59 is covered by the said piston so that pressure fluid, entering through the port 17 and supplied by the pilot pump 19, passes through the port 61 and the bore 58 into the chamber 88 where it acts upon the left side of the rod portion 53. This action causes the rod 45 to move toward the right until the rod portion 50 engages the surface 51 of the hollow arm 38 in which position the port 61 is again closed by the piston 65, as illustrated in Figure 2. The variable delivery pump is now in full stroke forward position.

*Second embodiment*

The embodiment of Figure 3 differs from the embodiment of Figures 1 and 2 substantially in that the shaft of the torque motor is in alignment with the valve rod instead of being arranged perpendicularly thereto, as illustrated in Figure 2. Most parts of the embodiment of Figure 3 are therefore the same as those of the embodiment of Figure 2 and are designated with the same reference numerals as the corresponding parts of Figure 2, however, provided with the additional letter *a*.

The servomotor head 68 of Figure 2 is replaced by an arm 90 connected with its flange 91 to the hollow arm 38a by means of screws 92. The arm 90 comprises two chambers, 93 and 94, separated from each other by a partition 95. Connected to the flange 96 of the arm 90 is a torque motor 23a having a splined motor shaft 67a. The motor shaft 67a engages a correspondingly splined bore 97 in a shaft 98 rigidly connected with the valve rod piston 64a. The shaft 98 passes through the partition 95 and is surrounded by packing material 99 compressed by a gland 100. The shaft 98 is furthermore surrounded and rigidly connected with a bushing 101 having an enlarged portion at one end thereof. A recess 103 is provided in the partition 95 between the bushing 101 and the packing material 99 to collect the fluid which leaks by the bushing 101 and to return it to exhaust through the conduit 80a. The bushing 101 is of the same diameter as the piston 66a so that the piston will be balanced hydraulically. A flanged cylindrical member 104 is secured by screws 105 to the face of the piston shaped valve rod portion 53a and is provided with radial bores 106. The cylindrical member 104 is provided with a recess carrying a key 108 which engages a correspondingly shaped recess in the nut 107 so as to allow longitudinal movement of the nut relative to the member 104, while preventing rotation of the nut 107 relative to the member 104. The nut 107 is threaded internally and engages a correspondingly shaped thread 109 on the shaft 98. By holding the nut 107 stationary and rotating the shaft 98 the valve rod piston 64a may be moved axially. A shoulder 110 on the shaft 98 limits the movement of the valve rod piston 64a in one direction relative to the nut and the enlarged portion 102 on the guide bushing 101 limits the movement of the valve rod piston 64a relative to the nut 107 in the other direction. The nut 107 comprises a recess 111 engaged by one end of a spring 112, the other end of which engages a recess 113 in the bushing 57a surrounding the valve rod piston 64a. The spring 112 urges the nut 107 continuously toward the left with regard to Figure 3.

The shaft 98 has at its free end thereof an annular groove 114 into which fits the tongue of a split collar 115 which is clamped about it. The split collar 115 is pivotally mounted on both sides to a forked lever 116 which in turn is pivotally mounted about the pivot 117. The lower end of the forked lever 116 is pivotally connected by a pivot 118 with a crank lever 119 (Figure 6), shiftable about the pin 120. The arm 121 of the crank lever 119 is adapted to be engaged by an arm 122 supported by the press ram 123.

Operation of second embodiment

The operation of the structure disclosed in Figure 3 will be best apparent from Figures 4 to 6.

Referring to Figure 6 which shows the servomotor of Figure 3 in neutral position and assuming that it is now intended to carry out a forward stroke of the press, the torque motor 23a and thereby also the shaft 98 connected with the piston 64a is rotated so that the nut 107 moves toward the left until it abuts the flange 125 of the cylindrical member 104. Since further leftward movement of the nut 107 is prevented while a portion of the thread 109 is still protruding toward the left from the nut 107, further rotation of the shaft 98 results in a rightward movement of the shaft 98 and thereby also of the piston 64a. This rightward movement of the piston 64a uncovers the port 61a so that the pressure fluid entering through pipe 18 passes through the port 61a and the left portion of the bore 58a and acting upon the left side of the area 126 of the rod portion 53a moves the latter toward the right until it is stopped by engagement of the rod portion 50a with the surface 51a. In this position the shift ring 47a has moved toward its right-hand position so that the pump is now on full delivery forward stroke. The fluid expelled during the rightward movement of the control rod 45a and the rod portion 50a is expelled through the ports 124a and 53a respectively (see Figure 3), into the exhaust pipe 14. The servomotor now occupies the position shown in Figure 4.

Supposing that the press ram 123 has reached its lowermost position and that a retraction stroke of the press is now desired; the motor 23a is energized in any convenient manner so as to carry out a reverse rotation. This results in a reverse rotation of the shaft 98 with the effect that due to the threaded engagement of the shaft 98 with the nut 107, the piston 64a uncovers a portion of the port 59a (see Figure 5), while the port 61a is closed. This leftward movement of the shaft 98 comes to a halt when the shoulder 110 engages the right side of the nut 107. It should be noted that a rightward movement of the nut 107 is prevented by the spring 112. Since a portion of the port 59a is uncovered by the piston 64a, pressure fluid entering through pipe 18 acts upon the area 127 of the rod portion 53a thereby causing the control rod 45a to move toward the left. This movement would space the flange 125 from the nut 107 if the spring 112 would not be present. However, due to the effect of the spring 112, the nut 107 is pushed toward the left so as to follow the flange 125 and continuously engage the latter. Due to the engagement of the nut 107 with the thread 109 of the shaft 98, also the shaft 98 is pushed toward the left by the spring 112 when the latter pushes the nut 107 toward the left. This follow-up movement started as soon as the piston 64a uncovered a portion of the port 59a, continues until the shift ring 47a abuts the left side of the pump casing 39a. The pump is then in its full delivery retraction stroke position, while the parts of the servomotor occupy the position shown in Figure 5. When the press ram 123 now approaches the end of its retraction stroke the arm 122 engages the arm 121 of the crank lever 119 which in its turn by means of the forked lever 116 moves the shaft 98 together with the nut 107 toward the right. As soon as the piston 64a uncovers a portion of the port 61a pressure fluid entering through the pipe 18 passes through the port 61a the left-hand portion of the bore 58a and acts upon the area 126 of the rod portion 53a. This causes a rightward movement of the control rod 45a thereby shifting the shift ring 47a toward neutral position. When the shift ring 47a approaches the neutral position the speed of the ram 123 gradually slows down and finally the pump stops with the parts of the servomotor in the position shown in Figure 6. The arrangement is now ready for a new cycle.

Third embodiment

Referring to Figure 7, the structure disclosed therein is somewhat similar to the structure of Figure 3. However, in contradistinction to the structure of Figure 3, the nut 107 of Figure 3 is rigidly connected with the control rod, while the splined engagement of the motor shaft 67a with the shaft 98 is eliminated. Referring more in detail to Figure 7, the valve rod 128 is on one end connected with the piston 64b and on the other end with a nut portion 129 comprising a longitudinal recess 130 engaging a key 131 connected with a hollow arm 132 flanged to the hollow arm 38b. In this way the valve rod 128 is adapted to reciprocate between the plate 143 arranged at the right-hand side of the hollow arm 132 and the stops 144 connected with the hollow arm 132, while the valve rod 128 is prevented from rotating. The threaded portion 129 is engaged by a shaft 133 which is clutched or otherwise connected to the shaft 134 of the torque motor 23b. The shaft 134 has also connected therewith a pinion 135 meshing with a rack 136 provided on the reciprocable rod 137. The rod 137 has adjustably connected therewith a collar 138 adapted to be engaged by the platen arm 139 of the press, generally designated 140, when the pressing ram 141 approaches its retraction stroke. If desired, any convenient means such as a relay may be added which will actuate the rack 136 at other points in the pressing cycle, either on forward or reverse stroke, to slow down or stop delivery. For manual operation, a crank 142 is keyed to the outer end of the motor shaft 134.

The remaining parts of the structure illustrated in Figure 7 correspond to those shown in Figure 3 and are, therefore, designated with the same reference numerals but instead of having the index a are provided with the index b.

Operation of third embodiment

Supposing the valve piston 64b occupies the position shown in Figure 7, which corresponds to its extreme right-hand position, and it is now intended to effect a leftward movement of the valve rod 128. To this end the motor 23b is energized and the motor shaft 134 rotated in the corresponding direction. The rotative movement of the shaft 134 is transmitted to the shaft 133 engaging the thread of the nut portion 129. The rotation of the thread of the shaft 133 in the thread of the nut portion 129 causes a leftward movement of the nut portion 129 and thereby of the piston 64b. As a result of this movement, the ports 145 of the control rod 45b are uncovered, while the ports 61b are closed. As soon as this happens, fluid between the rod portion 53b and the plate 143 escapes through the bores 89b and the ports 145 into the exhaust pipe 14, while pressure fluid entering through the pipe 18 and acting in the recess 63b causes the rod portion 53b and thereby the shift ring 47b to move toward the left, until the shift ring 47b engages the left side of the pump casing 39b. This position corresponds to the full delivery retraction stroke of the pump. When the ram 141 approaches the end of its retraction stroke the platen arm 139 engages the collar 138 and thereby lifts the rack 136 which, due to its engagement with the pinion 135, rotates the shafts 134 and 133 in a reverse direction, thereby moving the piston 64b somewhat toward the right to uncover the ports 61b partially while covering the ports 145. Pressure fluid entering through the pipe 18 then passes through the ports 61b, the left side of the bore 58b and acts upon the left side of the rod portion 53b thereby moving the latter together with the shift ring 47b toward the right until the latter reaches neutral position where the press comes to a halt.

For moving the shift ring 47b from neutral position to full delivery forward stroke position, it is merely necessary to energize the motor 23b so as to rotate the motor shaft 134 in a direction which will cause the nut portion 129 to move toward the right. Due to its engagement with the threaded portion of the shaft 133, rightward movement of the piston 64b will uncover the ports 61b, while closing the ports 145. Fluid pressure entering through the pipe 18 will then act upon the left-hand side of the rod portion 53b thereby moving the control rod 45b together with the shift ring 47b toward the right until the rod portion 53b engages the area 51b. This position corresponds to full delivery forward stroke position as shown in Figure 7.

If manual operation of the device illustrated in Figure 7 is desired, it is merely necessary to actuate the handle 142 for rotating the shaft 133.

It will be understood that we desire to comprehend within our invention such modifications as come within the scope of the invention and the claims.

Having thus fully described our invention, what we claim as new and desire to secure by Letters Patent, is:

1. In combination in a variable delivery pump with a flow-control member, a servomotor cylinder, a control rod reciprocable in said servomotor cylinder and connected to said flow-control member for actuating the same, said control rod having two oppositely effective areas, a source of pressure fluid for selectively supplying pressure fluid to one or the other of said areas to actuate said control rod, a reciprocable valve member associated with said control rod and adapted to control the supply of fluid to said areas, and reversible electric motor means adapted for stalled service for actuating said reciprocable valve.

2. In combination in a variable delivery pump with a flow-control member, a servomotor cylinder, a control rod therein connected with said flow-control member for effecting axial movement thereof, a source of pressure fluid adapted to supply fluid to said control rod for operating the same, said control rod having conduit means connected therewith for directing fluid from said fluid source to different effective areas of said control rod, a reciprocable valve member movable relative to said control rod and adapted to control the supply of fluid to said different effective areas, and a reversible electric stall motor for reciprocating said valve member.

3. In combination in a variable delivery pump with a flow-control member, a servomotor cylinder, a multi-area piston reciprocable in said cylinder and connected with said flow-control member, a source of pressure fluid for supplying fluid selectively to one of the areas of said piston, conduit means adapted to communicate with said fluid source and said areas, a valve piston adapted to be reciprocated for controlling communication of said conduit means with predetermined areas of said piston, and electric motor means adapted to reciprocate said valve piston.

4. In combination in a variable delivery pump with a flow-control member, a servomotor cylinder, a multi-area piston reciprocable in said cylinder and connected with said flow-control member for reciprocating the same, a source of pressure fluid for supplying fluid to predetermined areas of said piston, conduit means associated with said piston and adapted to effect hydraulic communication between said fluid source and predetermined areas of said piston, valve means adapted to control said communication, and an electric torque motor positively connected with said valve means for operating the latter.

5. In combination in a variable delivery pump with a flow-control member, a servomotor cylinder, a control rod therein connected to said flow-control member for shifting the same and provided with a plurality of areas adapted when being subjected to fluid pressure to cause movement of said control rod, a source of pressure fluid for supplying fluid selectively to one of said areas, valve means for controlling the supply of fluid from said fluid source to said areas, a torque motor, and an eccentric drivingly connected with said torque motor for operating said valve means.

6. In combination in a variable delivery pump with a flow-control member, a servomotor cylinder, a multi-area piston connected with said flow-control member for reciprocating the same, a pilot pump adapted to supply pressure fluid selectively to one of the areas of said piston, conduit means associated with said piston for effecting communication between said pump and the effective areas of said piston, a reciprocable valve member for controlling communication between said conduit means and the effective areas of said piston, an electric torque motor having its motor shaft arranged perpendicular with respect to said valve member, and eccentric means drivingly connected with said motor shaft and said valve member for reciprocating the latter.

7. In combination in a variable delivery pump with a flow-control member, a servomotor cylinder, a control rod therein connected to said flow-control member for shifting the same and provided with a multi-area piston, a source of pressure fluid adapted selectively to supply pressure fluid to one of said piston areas, said piston comprising a plurality of channels adapted to effect communication between said pressure fluid source and a selected area of said piston, a reciprocable valve member for controlling the flow of fluid through said channels, said valve member being connected with a crosshead having guiding means, and an electric torque motor operatively connected with an eccentric and a slide block slidably mounted in said guiding means and adapted to impart reciprocative movement to said valve member for operating the latter.

8. In combination in a variable delivery pump having a flow-control member movable selectively into one of two end positions or into an intermediate or neutral position, a servomotor cylinder, a control rod operatively connected with said flow-control member for shifting the same and comprising a multi-area piston, a pressure fluid source adapted to supply pressure fluid to a selected area of said piston for reciprocating said control rod, valve means reciprocable within said piston for controlling the supply of fluid from said fluid source to the selected area of said piston, a reversible electric torque motor operatively connected with said valve member for reciprocating the same, and shifting means associated with said valve member and operable for moving said flow-control member to neutral position without affecting the position of said torque motor.

9. In combination in a variable delivery pump having associated therewith a flow-control member controlling the supply of fluid of said variable delivery pump, a servomotor cylinder, a multi-area piston reciprocable in said cylinder and operatively connected with said flow-control member, a fluid pressure source adapted to supply fluid to a selected area of said multi-area piston for actuating the latter, valve means reciprocably mounted within said piston for controlling the supply of fluid from said fluid source to said selected piston area, a reversible torque motor having its motor shaft drivingly connected with said valve means for selectively shifting the same into one of two end positions or into an intermediate or neutral position, gear means operatively connected with said motor shaft and meshing with a rack operable for actuating said motor shaft to shift said valve means into its intermediate or neutral position.

10. In combination with a variable delivery pump having a flow-control member for controlling the supply of fluid thereof, a servomotor cylinder associated with said variable delivery pump, a fluid operable control rod comprising a multi-area piston reciprocable in said cylinder and operatively connected with said flow-control member, a plurality of channels in said piston adapted to effect communication between a fluid pressure source and a selected piston area of said multi-area piston, a valve member reciprocable relative to said piston for controlling communication between said channels and said selected piston area, a reversible electric torque motor having its motor shaft associated with eccentric means drivingly connected with said valve member, means for limiting the rotative movement of said motor shaft between two extreme positions, and a gear mechanism drivingly connected with said motor shaft and operable to return said motor shaft to a position intermediate said two extreme positions, to cause movement of said flow-control member to neutral or no-delivery position.

11. In combination with a variable delivery pump having a flow-control member associated with said variable delivery pump for controlling the flow of fluid thereof, a servomotor cylinder, a multi-area fluid operable piston reciprocable in said servomotor cylinder and drivingly connected with said flow-control member, a valve member reciprocable within said piston and adapted to control the flow of pressure fluid to a selected piston area of said multi-area piston, a reversible torque motor having an eccentric associated with its motor shaft, a sliding block connected with said eccentric and reciprocable in a crosshead drivingly connected with said valve member, means for limiting the rotative movement of said motor shaft between two extreme positions, a gear segment reciprocably connected with said motor shaft, and a reciprocable rack meshing with said gear segment and operable to move said motor shaft to a position intermediate said two extreme positions.

12. In combination in a variable delivery pump with a flow-control member, a servomotor cylinder, a control rod therein connected to said flow-control member for actuating the same, a source of pressure fluid adapted to supply fluid for operating said control rod, a reciprocable valve member associated with said control rod and adapted to control the supply of fluid for operating said control rod, and an electric motor having its motor shaft in alignment with said reciprocable valve member for actuating the latter.

13. In combination in a variable delivery pump with a flow-control member, a servomotor cylinder, a control rod therein connected with said flow-control member for effecting axial movement thereof, a source of pressure fluid adapted to supply fluid to said control rod for operating the same, said control rod having passageways for directing fluid from said fluid source to different effective areas of said control rod, a reciprocable valve member movable relative to said control rod and adapted to control the supply of fluid to said different effective areas, and an electric torque motor having its shaft in alignment with said valve member for actuating the latter.

14. In combination in a variable delivery pump with a flow-control member, a servomotor cylinder, a multi-area piston reciprocable in said cylinder and connected with said flow-control member, a source of pressure fluid for supplying fluid selectively to one of the areas of said piston, conduit means adapted to communicate with said fluid source and said areas, a valve piston adapted to be reciprocated for controlling communication of said conduit means with predetermined areas of said piston, an electric motor having its motor shaft in alignment with said valve piston, and means operatively interconnecting said motor shaft and said valve piston and adapted to effect reciprocation of said piston in accordance with the rotation of said motor shaft.

15. In combination in a variable delivery pump with a flow-control member, a servomotor cylinder, a multi-area piston reciprocable in said cylinder and connected with said flow-control member for reciprocating the same, a source of pressure fluid for supplying fluid to predetermined areas of said piston, conduit means associated with said piston and adapted to effect hydraulic communication between said fluid source and predetermined areas of said piston, a valve member reciprocably mounted within said multi-area piston, an electric reversible motor having its motor shaft in alignment with said valve piston, and means adapted to cause said valve member to move in one direction or the other in correspondence with the direction of rotation of said motor.

16. In combination in a variable delivery pump with a flow-control member, a servomotor cylinder, a control rod therein connected to said flow-control member for shifting the same and provided with a plurality of areas adapted when being subjected to fluid pressure to cause movement of said control rod, a source of pressure fluid for supplying fluid selectively to one of said areas, a reciprocable valve member for controlling the supply of fluid from said fluid source to said areas, a motor having its motor shaft in alignment with said reciprocable valve member, and screw means interconnecting said motor shaft with said valve member so as to effect reciprocation of said valve member in response to rotation of said motor shaft.

17. In combination in a variable delivery pump with a flow-control member, a servomotor cylinder, a control rod therein connected to said flow-control member for shifting the same, said control rod being provided with a multi-area piston, a source of pressure fluid adapted selectively to supply pressure fluid to one of said piston areas, said piston comprising a plurality of channels adapted to effect communication between said pressure fluid source and a selected area of said piston, a reciprocable valve member for controlling the flow of fluid through said channels, said valve member being provided with a threaded portion, and an electric torque motor having the axis of its rotor arranged in alignment with said valve member and being drivingly connected with a threaded shaft engaging the threaded portion of said valve member for imparting reciprocative movement to said valve member.

18. In combination in a variable delivery pump having a flow-control member, a servomotor cylinder, a control rod operatively connected with said flow-control member for shifting the same and comprising a fluid operable multi-area piston adapted to be hydraulically connected with a fluid source, a valve member reciprocable within said piston and controlling the supply of fluid to a selected area of said multi-area piston, an electric torque motor having its motor shaft in alignment with said valve member for effecting reciprocative movement of said valve member responsive to rotative movement of said motor shaft, and shifting means operable independently of said torque motor for moving said flow-control member to neutral position.

19. In combination in a variable delivery pump having associated therewith a flow-control member controlling the supply of fluid of said variable delivery pump, a servomotor cylinder, a piston reciprocable in said cylinder and having a plurality of areas adapted selectively to be connected with a fluid pressure source, said piston being operatively connected with said flow-control member, a valve member reciprocably mounted within said piston for controlling the supply of fluid to a selected piston area of said reciprocable piston, a reversible electric torque motor having its motor shaft in alignment with said valve member, said motor shaft being in engagement with said valve member so as to be adapted to impart rotative movement upon the latter while permitting relative movement in axial direction between said motor shaft and said valve member, and gear means drivingly connected with said motor shaft and operable for returning said motor shaft to an intermediate position.

20. In combination in a variable delivery pump with a flow-control member, a servo-motor cylinder, a control rod therein connected to said flow-control member and being provided with a multi-area piston reciprocably mounted in said servomotor cylinder, a source of pressure fluid for operating said control rod, a reciprocable valve member within said control rod and adapted to control the supply of fluid for operating said control rod, and an electric motor having its motor shaft in alignment with said valve member and slidably mounted therein for actuating said valve member.

21. In combination in a variable delivery pump with a flow-control member, a servomotor cylinder, a control rod having a multi-area piston connected therewith and reciprocable in said servomotor cylinder for actuating said flow-control member, a source of pressure fluid for supplying pressure fluid to a predetermined area of said multi-area piston, a valve member associated with said control rod for controlling the supply of fluid from said fluid source to said predetermined piston area, said valve member having a threaded portion, a nut engaging said threaded portion and being reciprocably mounted but prevented from rotation, and an electric motor having its motor shaft in alignment with said valve member and being adapted in cooperation with said nut to control the movement of said valve member.

22. In combination in a variable delivery pump with a flow-control member, a servomotor cylinder, a control rod therein connected to said flow-control member for actuating the same, a source of pressure fluid for operating said control rod, a reciprocable valve member associated with said control rod and adapted to control the supply of fluid for operating said control rod, and a reversible motor having its motor shaft in alignment with said valve member and splined thereto for effecting reciprocation of said valve member in response to rotation of said motor shaft.

23. In combination in a variable delivery pump with a flow-control member, a servomotor cylinder, a control rod therein connected to said flow-control member for actuating the same, a source of pressure fluid for operating said control rod, a valve member having a longitudinal shaft and being adapted to control the supply of fluid from said fluid source for operating said control rod, a reversible motor having a splined motor shaft telescoped in a correspondingly splined portion of said valve member shaft, and means operatively connecting said motor shaft with said valve member shaft for converting rotative movement of said motor shaft into reciprocative movement of said valve member.

24. In combination in a variable delivery pump with a flow control member, a servo-motor cylinder, a control rod associated with said flow-control member for actuating the same, a source of pressure fluid for operating said control rod, a valve member associated with said control rod and adapted to control the supply of fluid from said fluid source for operating said control rod, a threaded shaft connected with said valve member and having spaced stops adjacent the ends of the threaded portion on said shaft, a nut engaging the threaded portion of said shaft and being reciprocable thereon, means preventing rotation of said nut, stop means connected with said control rod for stopping the movement of said nut in one direction, spring means continuously urging said nut against said stop means, and a reversible motor having its motor shaft in alignment with said threaded shaft and being adapted in cooperation with said nut to impart a reciprocable movement on said valve member in accordance with the rotation of said motor shaft.

25. In combination in a variable delivery pump with a flow-control member, a servo-motor cylinder, a control rod therein connected to said flow-control member for actuating the same and having a plurality of piston areas, a source of pressure fluid for supplying fluid selectively to one of said piston areas, a reciprocable valve member associated with said control rod for controlling the supply of fluid selectively to one of said piston areas, an electric torque motor having its motor shaft arranged in alignment with said reciprocable valve member, means drivingly interconnecting said motor shaft with said valve member so as to cause a reciprocative movement of said valve member in response to a rotative movement of said motor shaft, and means operable independently of said motor for actuating said valve member.

26. In combination in a variable delivery pump with a flow-control member, a servo-motor cylinder, a control rod therein connected to said flow-control member for actuating the same and provided with a plurality of piston areas, a source of pressure fluid for operating said control rod, a reciprocable valve member associated with said control rod and adapted to control the supply of fluid from said fluid source to a predetermined area of said piston areas, an electric torque motor having its motor shaft telescoped in said valve member so as to allow axial movement of said valve member relative to said motor shaft, while preventing rotative movement of said valve member with regard to said motor shaft, means operatively interconnecting said motor shaft with said valve member so as to effect longitudinal movement of said valve member in accordance with rotative movement of said motor shaft, and lever means operable independently of said first mentioned means for spacing said valve member from said motor shaft without actuating the latter.

27. In combination in a variable pressure fluid pump having associated therewith a flow-control member for controlling the delivery of fluid thereof, a servomotor cylinder associated with said pressure fluid pump, a control rod reciprocably mounted in said cylinder and comprising a multi-area piston for operating said flow-control member, said cylinder having passageways therein adapted to convey pressure fluid to a predetermined area of said piston for actuating said piston, a reciprocable valve member associated with said piston for controlling the supply of fluid from said fluid source to said selected piston area, a reversible electric torque motor having its motor shaft in alignment with said reciprocable valve member, screw means operatively interconnecting said motor shaft with said valve member and adapted to cause movement of said valve member in one or the other direction responsive to the direction of rotation of said motor shaft, and a lever system operatively connected with said valve member and operable to actuate said valve member independently of said motor to move said flow-control member to substantially neutral position.

HOWARD F. MacMILLIN.
IRA B. LAWYER.
WALTER ERNST.